B. J. LONG & J. I. KEITH.
FISHING TOOL.
APPLICATION FILED JUNE 27, 1911.
1,015,198.
Patented Jan. 16, 1912.
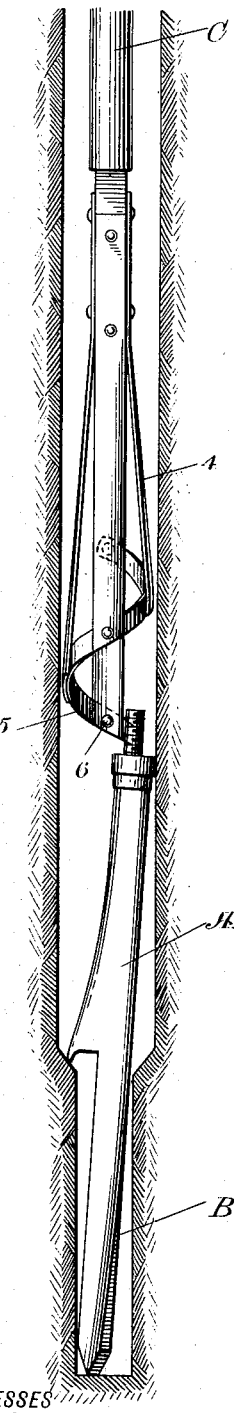
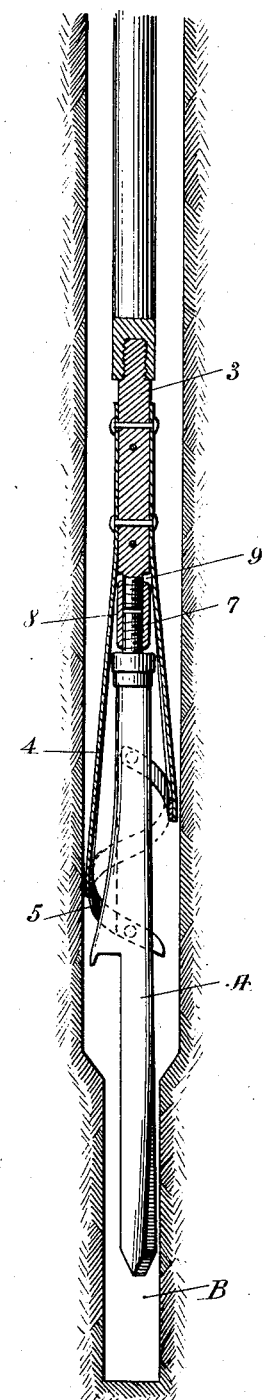
WITNESSES
G. Robert Thomas
W. S. Orton
INVENTORS
Benton J. Long
John I. Keith
BY
Munn & Co
ATTORNEYS

UNITED STATES PATENT OFFICE.

BENTON J. LONG AND JOHN I. KEITH, OF FINLEY, NORTH DAKOTA.

FISHING-TOOL.

1,015,198.  Specification of Letters Patent.  Patented Jan. 16, 1912.

Application filed June 27, 1911. Serial No. 635,545.

*To all whom it may concern:*

Be it known that we, BENTON J. LONG and JOHN I. KEITH, both citizens of the United States, and residents of Finley, in the county of Steele and State of North Dakota, have invented a new and Improved Fishing-Tool, of which the following is a full, clear, and exact description.

Our invention relates to a new and improved form of guide for fishing tools, more particularly adapted for use in finding the lost drill in well-boring operations, or for tapping the end of lost piping.

An object of our invention is to provide a simple and readily constructed tool, which will encompass the lost drilling tool, and will guide the same into a receiving socket, or will guide a taper tap into the end of a lost pipe.

We attain the above-outlined objects by disposing a funnel-shaped member having a spiral-shaped lower edge to the end of the drilling rod. At the apex of the funnel-shaped member is disposed an internally-threaded socket to engage the threaded shank of the lost tool or taper tap.

With the above and other objects in view, as will more fully appear hereinafter, the present invention consists in certain novel details of construction and arrangement of parts hereinafter fully described, illustrated in the accompanying drawings, and more particularly pointed out in the appended claim.

Reference is to be had to the accompanying drawings, forming a part of this specification, in which similar characters of reference indicate corresponding parts in both the figures, and in which—

Figure 1 is a side elevation of a preferred embodiment of our invention in position ready to telescope a lost drilling tool; and Fig. 2 is a view similar to Fig. 1, certain parts shown in section and showing the fishing tool engaging the drilling tool.

Described more in detail, we have shown a lost drilling tool A disposed at the bottom of the drilled well B, in which is shown a guide rod C, to which is screw-threaded a square shank 3, from each of the sides of which extends an outwardly and downwardly-curved plate 4, each of which plates is slightly longer than the preceding plate moving clockwise about the shank 3. To the lower end of each plate 4 is a spiral-shaped edge plate 5, one end of which is attached to the shortest of the plates 4, and the other end of which is fastened to the longest of the plates 4. This edge plate 5 is attached to the several plates 4 by means of rivets 6. It will be seen that by this construction the rotation of the rod C will cause the lower end of the guide to work on the corkscrew principle, to engage about the upper end of the lost boring tool A, and due to the funnel-shaped construction formed by the plates 4, this lost tool will be tilted to an erect position as shown in Fig. 2 and guided toward the socket 7 formed by the internally-threaded sleeve 8, which sleeve is in screw-threaded engagement with a screw-threaded stud 9 depending from the lower end of the shank 3 and at the apex of the funnel formed by the plates 4. It will be seen that rotating the guide rod C will not only cause the lost fishing tool A to assume an erect position, but will bring it into alinement with and will insert the same into the socket 7, after which the lost tool may be withdrawn from the well, reinserted in its proper drilling rod, and the operation of drilling the well continued. In the case of a lost pipe section, a taper tap may be inserted in the sleeve 8 and the guide will find the lost section and the tap may be threaded in the bore thereof.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claim is intended to cover the full scope of the invention and is not to be given any narrower construction than the prior art demands, and that materials, sizes and relativities of parts are non-essential, except as called for in the claim.

Having thus described our invention, we claim as new and desire to secure by Letters Patent:

In a fishing tool, a socket, a series of plates disposed about said socket and extending from the same, said plates extending outwardly from said socket, to form a funnel-shaped member, said plates being of different lengths, starting with the shortest plate each succeeding plate being longer than the preceding plate, and a spirally formed plate connecting the ends of said plates, thereby forming a finding means adapted to embrace a lost article.

In testimony whereof we have signed our names to this specification in the presence of two subscribing witnesses.

BENTON J. LONG.
JOHN I. KEITH.

Witnesses:
 FRANK E. CURRY,
 J. F. RESTLESE.